US006792267B1

(12) United States Patent
Backstrom et al.

(10) Patent No.: US 6,792,267 B1
(45) Date of Patent: Sep. 14, 2004

(54) SYSTEMS AND METHODS FOR UPLINKING DOWNSAMPLED RADIOTELEPHONE SIGNALS FROM CELLULAR RADIOTELEPHONE BASE STATIONS TO A CELLULAR RADIO EXCHANGE

(75) Inventors: Olof Tomas Backstrom, Cary, NC (US); Ronald L. Bexten, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 805 days.

(21) Appl. No.: 09/087,528

(22) Filed: May 29, 1998

(51) Int. Cl.⁷ .............................. H04Q 7/20; H04B 7/00; H04B 1/38
(52) U.S. Cl. .................... 455/422.1; 455/560; 455/561; 455/502; 455/524; 375/220; 375/377
(58) Field of Search .............................. 455/561, 560, 455/524, 445, 504, 502, 525, 439, 422; 370/347; 375/220, 229, 377, 219, 356; 364/724.1

(56) References Cited

U.S. PATENT DOCUMENTS

| | | | | | |
|---|---|---|---|---|---|
| 5,230,086 A | * | 7/1993 | Saul | ........................... | 455/502 |
| 5,396,520 A | * | 3/1995 | Degges | ....................... | 375/316 |
| 5,499,272 A | * | 3/1996 | Bottomley | | |
| 5,555,260 A | * | 9/1996 | Rinnback et al. | ........... | 370/347 |
| 5,592,480 A | * | 1/1997 | Carney et al. | .............. | 370/347 |
| 5,640,385 A | * | 6/1997 | Long et al. | ................. | 375/220 |
| 5,722,074 A | * | 2/1998 | Muszynski | .................. | 455/442 |
| 5,742,640 A | * | 4/1998 | Haoui et al. | ................. | 375/220 |
| 5,758,294 A | * | 5/1998 | Ganesan et al. | ............ | 455/561 |
| 5,764,704 A | * | 6/1998 | Shenoi | ........................ | 375/220 |
| 5,787,348 A | * | 7/1998 | Willey et al. | ................ | 455/561 |
| 5,812,949 A | * | 9/1998 | Taketsugu | ................... | 455/439 |
| 5,862,492 A | * | 1/1999 | Leppanen et al. | .......... | 455/560 |
| 5,867,791 A | * | 2/1999 | Chambert | .................... | 455/525 |
| 5,940,774 A | * | 8/1999 | Schmidt et al. | ............. | 455/561 |
| 6,005,506 A | * | 12/1999 | Bazarjani et al. | ........... | 375/332 |
| 6,091,788 A | * | 7/2000 | Keskitalo et al. | ........... | 455/561 |

FOREIGN PATENT DOCUMENTS

WO      WO 94/28690      12/1994

* cited by examiner

*Primary Examiner*—Simon Nguyen
(74) *Attorney, Agent, or Firm*—Myers Bigel Sibley & Sajovec (57) ABSTRACT

Cellular radiotelephone communication systems and methods downlink digital coded speech from a cellular radio exchange to a cellular radiotelephone base station and uplink downsampled (i.e. undersampled relative to the Nyquist rate of two samples per symbol) radiotelephone signals from the cellular radiotelephone base station to the cellular radio exchange. The downsampled radiotelephone signals are demodulated at the cellular radio exchange and the digital coded speech is modulated at the cellular radiotelephone base station. Diversity demodulation may be used at the cellular radio exchange, to diversity demodulate the downsampled radiotelephone signals at the cellular radio exchange. By downlinking digital coded speech from the cellular radio exchange to the cellular radiotelephone base station, and uplinking downsampled radiotelephone signals from the cellular radiotelephone base station to the cellular radio exchange, narrowband uplinks and downlinks may be provided between the base stations and the cellular radio exchange, to thereby reduce cost. Moreover, since demodulation takes place at the cellular radio exchange rather than at the base stations, low cost base stations may be provided. However, since downsampled radiotelephone signals are transmitted from the base stations to the cellular radio exchange, diversity demodulation may be performed at the cellular radio exchange, to thereby improve the voice quality of the cellular radiotelephone communications.

47 Claims, 8 Drawing Sheets

SYSTEMS AND METHODS FOR UPLINKING DOWNSAMPLED RADIOTELEPHONE SIGNALS FROM CELLULAR RADIOTELEPHONE BASE STATIONS TO A CELLULAR RADIO EXCHANGE

FIELD OF THE INVENTION

This invention relates to communications systems and methods, and in particular to radiotelephone communications systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Figure 1:
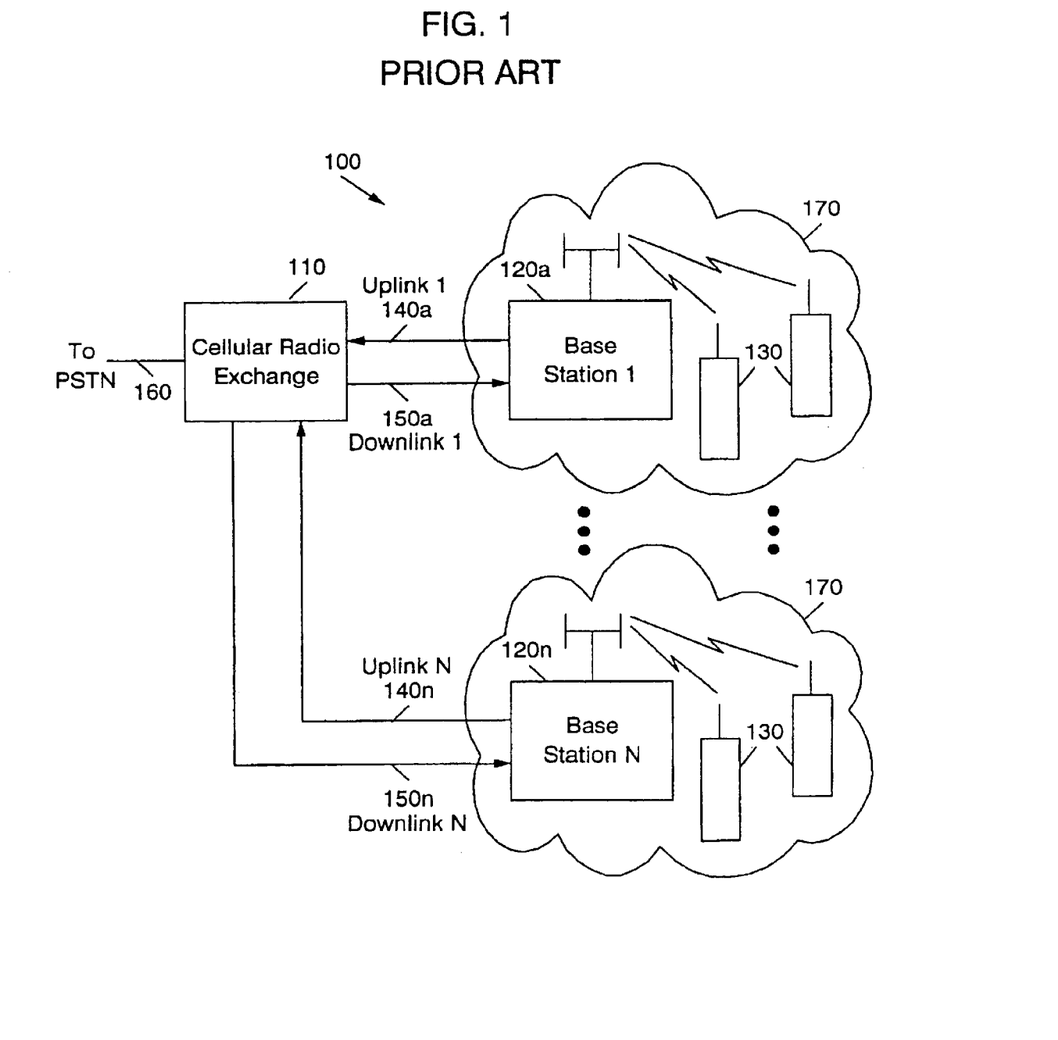
FIG. 1 is a block diagram of a conventional cellular radiotelephone system.

FIG. 1 is a block diagram of a conventional cellular radiotelephone communication system. As shown in FIG. 1, cellular radiotelephone communication system 100 includes a plurality of cells 170 each of which includes a base station 120a–120n. Although two cells 170 are shown in FIG. 1, it will be understood that a large number of cells and a large number of base stations 120a–120n are generally included in the cellular radiotelephone communication system. Cellular radiotelephones 130 in the cells 170 communicate with the base stations 120a–120n.

Cellular radio exchange 110 is connected to each of the base stations 120a–120n via a respective uplink 140a–140n and a respective downlink 150a–150n. Cellular radio exchange 110 controls communication among the cellular radiotelephones via the base stations. Cellular radio exchange also controls communications between the cellular radiotelephones 130 and wire telephones via a connection 160 to the Public Switched Telephone Network (PSTN). The design of cellular radiotelephone communication system 100 is well known to those having skill in the art and need not be described further herein.

Cellular radiotelephone communication systems are often installed for communications over a large geographic area using large cells, as evidenced by the cellular radiotelephone base stations that have now become a commonplace sight along highways. However, in densely populated cities, the cells may be small, covering several city blocks or less. Recently, it has also been proposed to provide cellular radio communication systems within a building in a DAMPS Wireless Office System (DWOS). In such a wireless office system, base stations may be located in spaced apart locations on one or more floors of an office building, to thereby provide wireless communications within the office building using conventional cellular radiotelephones.

In cellular systems, there may be conflicting requirements that may affect the architecture of the cellular radio exchange and the base stations. For example, it is generally desirable to produce low cost base stations and cellular radio exchanges. On the other hand, high quality voice communications should be provided by the cellular radiotelephone system.

More specifically, in a wireless office system, it is generally desired to maintain low cost of the base stations because many base stations are used in the system compared to the cellular radio exchange. In order to support high quality voice communication, it is also generally desired to use macro diversity, wherein radio frequency communications from a cellular radiotelephone are received by more than one receiver at a base station, to thereby allow diversity reception and improve radio link quality.

Figures 2, 2A:
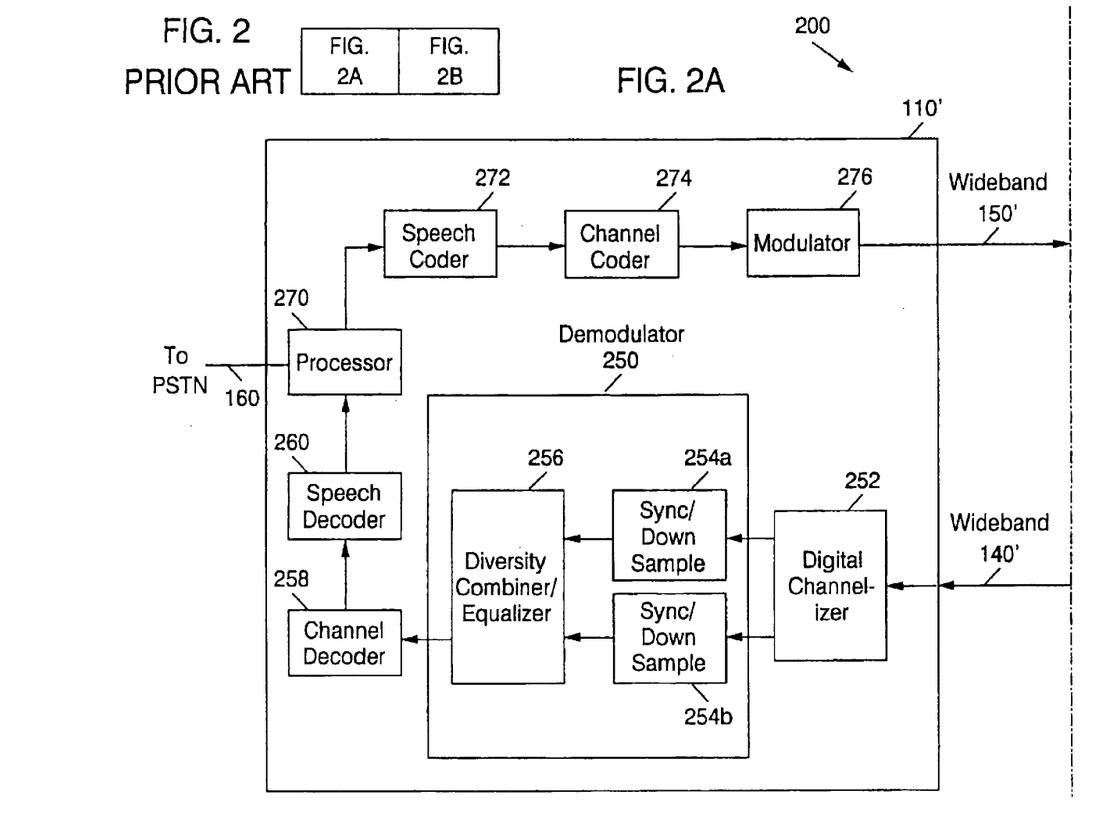
FIG. 2 is a block diagram of a conventional wideband cellular radiotelephone system.
Figure 2B:
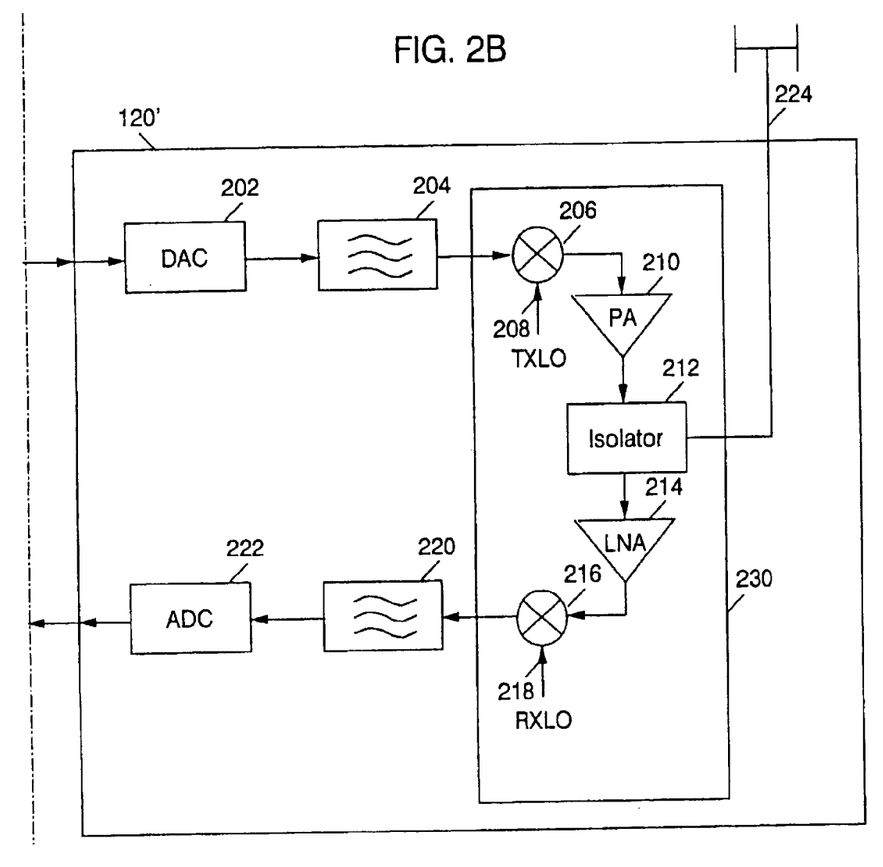

FIG. 2 illustrates a conventional cellular radiotelephone system with wideband transmissions between the base stations and cellular radio exchange. More specifically, in FIG. 2, cellular radiotelephone system 200 includes a base station 120' and a cellular radio exchange 110', wherein wideband signals are uplinked from the base station 120' to the cellular radio exchange 110' over uplink 140', and wideband signals are downlinked from cellular radio exchange 110' to base station 120' over downlink 150'. It will be understood that although FIG. 2 illustrates only one base station 120', many base stations conventionally are used. Moreover, more than one cellular radio exchange 110' may also be used. The uplink 140' and downlink 150' may be provided by a radio frequency uplink and downlink, or a wired uplink and downlink, as is well known to those having skill in the art.

More specifically, the wideband architecture of FIG. 2 uses wideband digital distribution of digital Intermediate Frequency (Digital IF) signals, for example at a rate of 10–1000 megabits per second (Mbps). In the wideband architecture, the entire frequency band of received cellular radiotelephone communications is sampled and these samples are uplinked to the cellular radio exchange 110' for processing. Thus, the base stations need only act as relays, so that the base stations can be simple and low cost. Signal processing complexity is placed in the cellular radio exchange 110', where the central processing power can be shared and used efficiently to further decrease cost.

More specifically, referring to FIG. 2, base station 120' includes a digital-to-analog converter (DAC) 202 that receives wideband digital distribution signals, for example at rates between 10–1000 Mbps, from downlink 150'. A first wideband channel filter 204 filters the analog signal. The filtered analog signal is provided to a radio frequency transmitter/receiver (transceiver) 230 that includes a first modulator 206, a transmit local oscillator (TXLO) 208, a power amplifier 210 and an isolator 212. The amplified radio frequency signal from power amplifier 210 is transmitted via antenna 224, to provide radiotelephone communications with a radiotelephone 130.

Radiotelephone communications that are received from a radiotelephone 130 at antenna 224 are routed to low noise amplifier 214 by isolator 212 and are then down-converted from radio frequency by a second modulator 216 using receive local oscillator (RXLO) 218. The output of second modulator 216 is provided to second wideband channel filter 220 and to an analog-to-digital converter (ADC) 222. The digitized output of analog-to-digital converter 222 is uplinked to cellular radio exchange 100 via wideband uplink 140'. Accordingly, similar to downlink 150', uplink 140' is a wideband digital uplink, for example at rates between 10–1000 Mbps.

At the cellular radio exchange 110', the wideband uplink 140 is received by digital channelizer 252 and separated into two or more digital channels that are provided to a demodulator 250. Demodulator 250 includes at least two synchronizer/downsamplers 254a and 254b, that synchronize and downsample the digital channels created by the digital channelizer 252. The synchronized and downsampled signals are then provided to a diversity combiner/equalizer 256 that can perform macro-diversity combining. The output of the diversity combiner/equalizer 256 is provided to a channel decoder 258, the output of which is provided to speech decoder 260. The decoded speech is then provided to a processor 270, for example at 64 kilobits per second (Kbps) per call (i.e. per radiotelephone communication), which can perform control functions, such as routing signals to PSTN 160 and other base band and signal processing functions such as echo canceling.

When a signal is received by processor 270 that is to be transmitted to a radiotelephone 130, the signal is provided to speech coder 272 (for example at 8 Kbps/call) and channel decoder 274. Channel coder 274 may provide I/Q symbols at 48.6 Kbps per call. The speech coded signal is then provided to modulator 276 to produce the wideband signal that is downlinked to base station 120' over downlink 150'. The overall design of base station 120' and cellular radio exchange 110', as well as the design of the individual components thereof, as shown in FIG. 2 are well known to those having skill in the art and need not be described in detail herein. An example of wideband architectures is described in U.S. application Ser. No. 08/540,326, filed Oct. 6, 1995 al., entitled Distributed Indoor Digital Multiple-Access Cellular Telephone System now U.S. Pat. No. 5,903,834, issued May 11, 1999, the disclosure of which is hereby incorporated herein by reference.

Accordingly, in a wideband system as described above, a low-cost architecture can be provided because the base stations 120' are relatively simple, while the primary processing functions are performed in the central cellular radio exchange 110'. Moreover, voice quality can be high because diversity demodulation may take place in the cellular radio exchange 110'. Unfortunately, a wideband architecture of FIG. 2 may require the use of high speed transport technology, for example in the range of 10–1000 Mbps, over moderately long distances up to 100 meters or more. It may be difficult and costly to transport samples from the base station to the cellular radio exchange using conventional technology such as fiber optics, high speed copper and xDSL. In many applications, the added cost from the sample transport system can make the wideband architecture unattractive.

Figures 3, 3A:
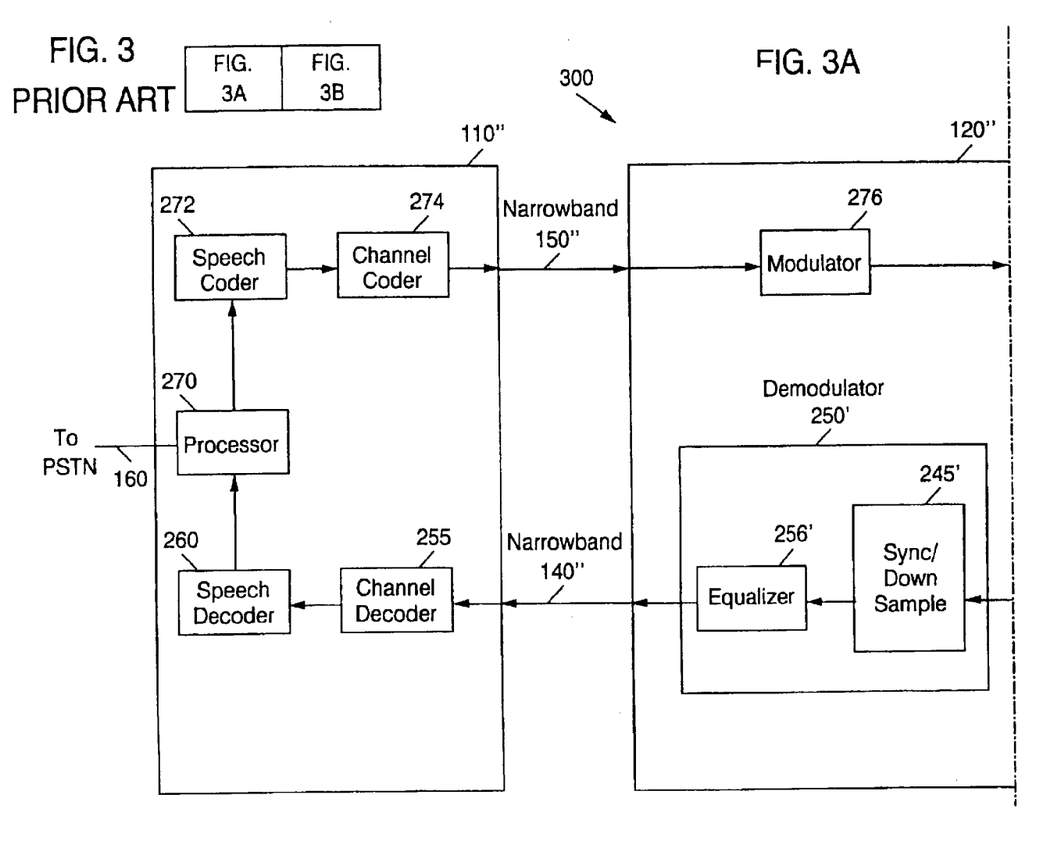
FIG. 3 is a block diagram of a conventional narrowband cellular radiotelephone communication system.
Figure 3B:
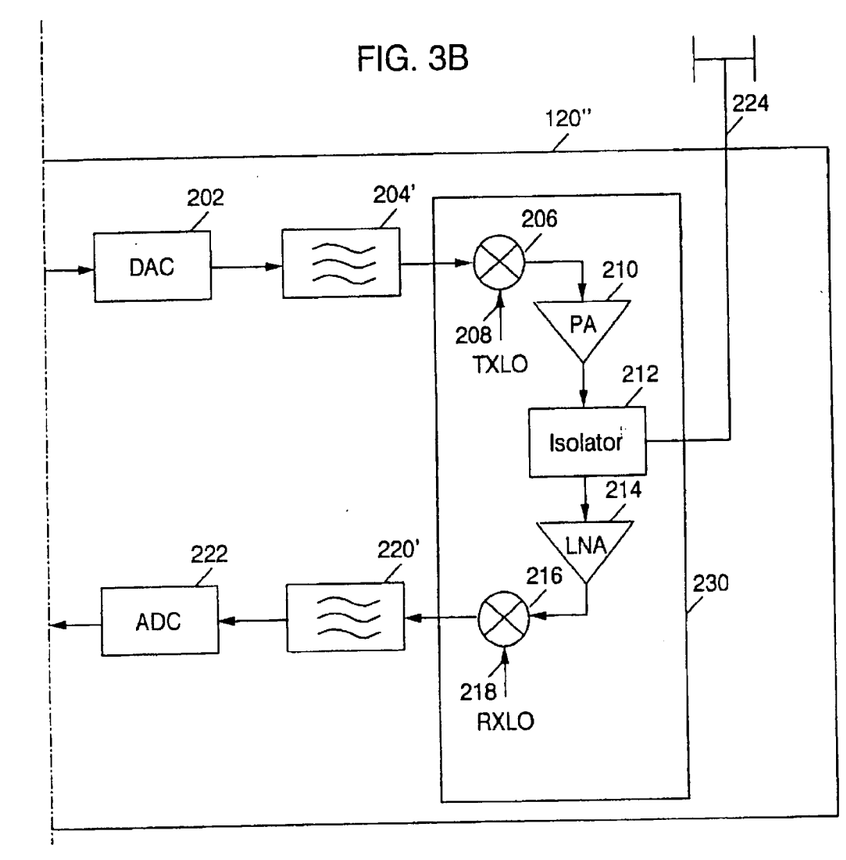

FIG. 3 illustrates a narrowband architecture for a cellular radiotelephone communication system. As shown in FIG. 3, narrowband cellular radiotelephone communication system 300 includes a narrowband downlink 150" that downlinks narrowband digital information, for example at 16.1 Kbps per call and a narrowband uplink 140" that uplinks narrowband digital signals at 16.1 Kbps/call from the base station 120' to the cellular radio exchange 110. Compared to FIG. 3, modulator 276 is moved from the cellular radio exchange 110" to the base station 120" and filters 204' and 220' are narrowband filters. Moreover, demodulator 250' is moved from the central cellular radio exchange 110' to the base station 120". As also shown in FIG. 3, demodulator 250' includes a single synchronizer/downsampler 245' and an equalizer 256'. Since separate diversity channels have not been channelized, macro diversity combining is generally not performed in base station 120'. Macro diversity can be performed in the cellular radio exchange by adding radio quality information to the narrowband signal. Unfortunately, this type of macro diversity may have the performance of a switched diversity receiver, which may be less than the performance of in-phase addition diversity in a wideband signal. The overall design of base station 120" and cellular radio exchange 110", as well as the design of the individual component thereof, as shown in FIG. 3 are well known to those having skill in the art and need not be described in detail herein.

The narrowband architecture as described in FIG. 3 is widely used in many cellular radiotelephone architectures including DECT, GSM, PDC and AMPS/DAMPS. The narrowband architecture allows standard ISDN, T1 or E1 narrowband uplinks 140" and downlinks 150" to be used between the base stations 120" and the cellular radio exchange 110'. Accordingly, samples may be transported at low cost. The complexity of the signal processing in the cellular radio exchange 110" may also be reduced compared to cellular radio exchange 110' of FIG. 2, so that the cost thereof may be reduced.

Unfortunately, the narrowband architecture shifts processing from the central radio exchange 110" to the base stations 120', which may make the base stations more expensive. Since there are generally many more base stations 120" than cellular radio exchanges 110", the overall cost of the narrowband cellular radiotelephone communication system 300 may increase dramatically.

Moreover, the narrowband architecture generally does not use macro diversity. The lack of macro diversity can further increase costs due to the increase in the number of base stations that may be needed to improve coverage. The lack of macro diversity can also decrease voice quality due to poor radiotelephone communication transmissions between the radiotelephones and the base stations.

Accordingly, notwithstanding the use of wideband and narrowband architectures between the cellular radio exchange and the base stations of a cellular radiotelephone communication system, there continues to be a need for cellular radiotelephone system architectures that can provide reduced cost, high quality and diversity processing.

SUMMARY OF THE INVENTION

It is therefore an object of the present invention to provide cellular radiotelephone communication systems and methods that can include low cost base stations.

It is another object of the present invention to provide cellular radiotelephone communication systems and methods that can include low cost base stations without the need for expensive uplinks and downlinks between the base stations and the cellular radio exchange.

It is still another object of the present invention to provide cellular radiotelephone communication systems and methods that can include low cost base stations without the need for expensive uplinks and downlinks between the base stations and the cellular radio exchange, and which also can perform diversity processing, to thereby improve voice quality of cellular radiotelephone communications.

These and other objects are provided according to the present invention, by cellular radiotelephone communication systems and methods that downlink digital coded speech from the cellular radio exchange to the cellular radiotelephone base station and that uplink downsampled (i.e. undersampled relative to the Nyquist rate of two samples per symbol) radiotelephone signals from the cellular radiotelephone base station to the cellular radio exchange. The downsampled radiotelephone signals are demodulated at the cellular radio exchange and the digital coded speech is modulated at the cellular radiotelephone base station. Diversity demodulation may be used at the cellular radio exchange, to diversity demodulate the downsampled radiotelephone signals at the cellular radio exchange.

By downlinking digital coded speech from the cellular radio exchange to the cellular radiotelephone base station, and uplinking downsampled radiotelephone signals from the cellular radiotelephone base station to the cellular radio exchange, narrowband uplinks and downlinks may be provided between the base stations and the cellular radio exchange, to thereby reduce cost. Moreover, since demodulation takes place at the cellular radio exchange rather than at the base stations, low cost base stations may be provided. However, since downsampled radiotelephone signals are transmitted from the base stations to the cellular radio exchange, diversity demodulation may be performed at the cellular radio exchange, to thereby improve the voice quality of the cellular radiotelephone communications. Thus, for example, downlinking and uplinking may be performed at rates that are an order of magnitude of Kbps per radiotelephone communication. Accordingly, low-cost, high-quality cellular radiotelephone communication systems and methods may be provided.

In preferred embodiments of the present invention, uplinking downsampled radiotelephone signals from the cellular radiotelephone base station to the cellular radio exchange is obtained by downsampling received radiotelephone signals at the cellular radiotelephone base station. Downsampling is performed in a narrowband receiver at the cellular radiotelephone base station. Downsampling is preferably performed by first oversampling (relative to the Nyquist rate) the received radiotelephone signals at the cellular radiotelephone base station and using these samples to perform synchronization. Thereafter, the synchronized received radiotelephone signals are undersampled (relative to the Nyquist rate) and the undersampled received radiotelephone signals are uplinked to the cellular radio exchange.

Cellular radiotelephone communication systems according to the present invention include a plurality of cellular radiotelephone base stations that communicate with a plurality of cellular radiotelephones and that uplink downsampled radiotelephone signals. A cellular radio exchange receives the uplinked downsampled radiotelephone signals and downlinks digital coded speech to the plurality of cellular radiotelephone base stations. The cellular radio exchange also includes a demodulator that demodulates the downsampled radiotelephone signals and the cellular radiotelephone base stations include a modulator that modulates the digital coded speech. The cellular radio exchange also includes a decoder that is responsive to the demodulator, to decode speech from the demodulated downsampled radiotelephone signals. The cellular radiotelephone base stations include a radio frequency transmitter/receiver (transceiver) that is responsive to the modulator, to transmit the modulated digital coded speech as a radio frequency signal that is received by the cellular radiotelephones.

Preferably, the demodulator in the cellular radio exchange is a narrowband diversity demodulator. The cellular radiotelephone base station also preferably includes a narrowband downsampler that downsamples received radiotelephone signals. The downsampler preferably comprises an oversampler that oversamples the received radiotelephone signals to establish synchronization and an undersampler that is responsive to the oversampler to undersample the synchronized received radiotelephone signals. Accordingly, the uplink from the base stations to the cellular radio exchange is relatively narrowband, to thereby allow low cost uplink. However, the uplink is preferably undersampled synchronized radiotelephone signals, so that diversity demodulation may be performed in the cellular radio exchange.

Accordingly, a low cost uplink may be provided, while still retaining much of the processing power in the cellular radio exchange. Diversity demodulation may be used for improved voice quality. It will be understood that the present invention may be provided as communications methods between a cellular radiotelephone base station and a cellular radio exchange, communications methods by a cellular radiotelephone base station, communication methods by a cellular radio exchange and may also be provided as cellular radiotelephone communication systems, cellular radiotelephone base stations and cellular radio exchanges.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figures 4, 4A:
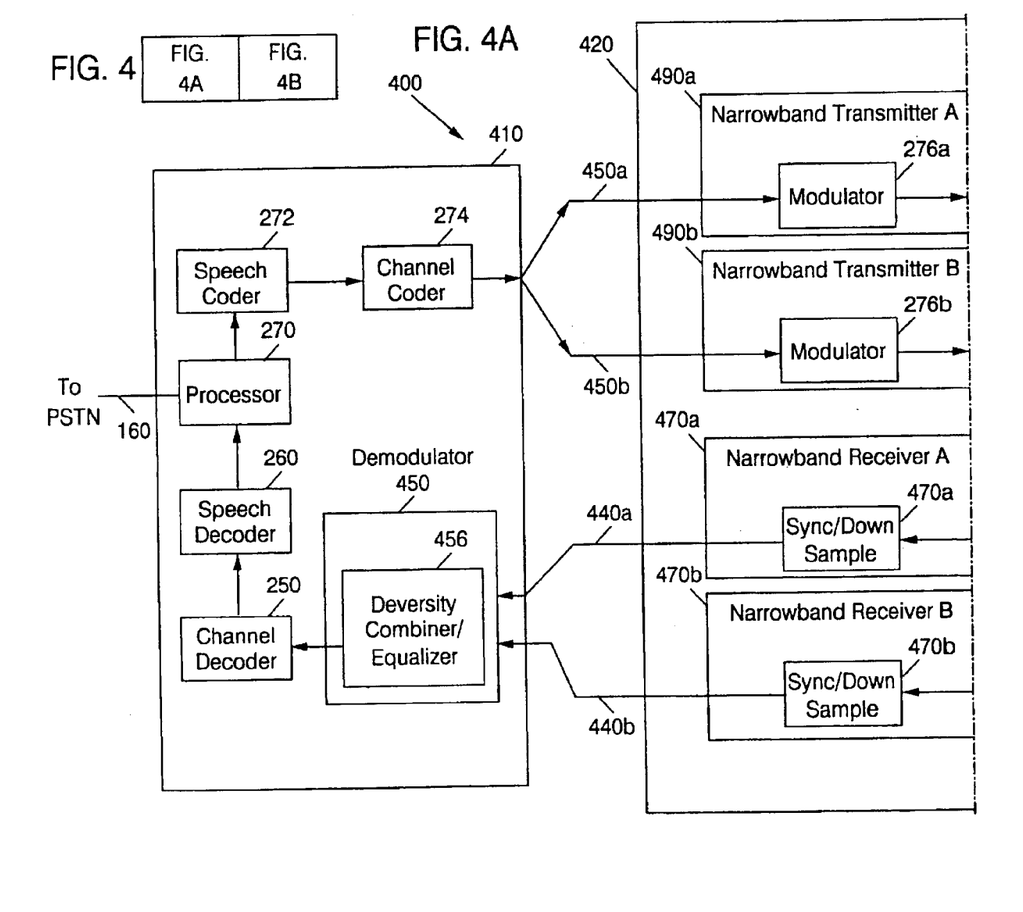
FIG. 4 is a block diagram of cellular radiotelephone systems and methods according to the present invention.
Figure 4B:
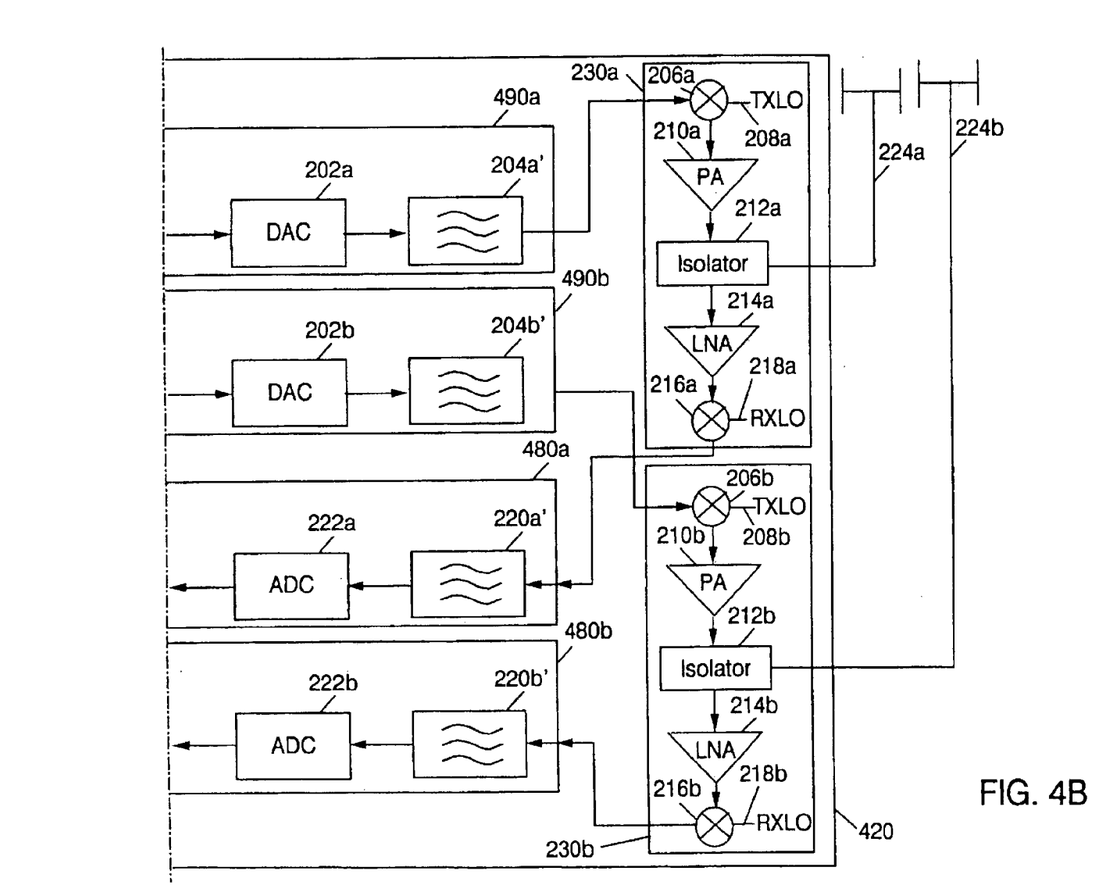

Referring now to FIG. 4, cellular radiotelephone systems and methods according to the present invention will now be described. As shown in FIG. 4, a narrowband uplink 440a, 440b is provided between base station 420 and cellular radio exchange 410. A narrowband downlink 450a, 450b is provided from the cellular radio exchange 410 to the base station 420. The narrowband downlink 450a, 450b may be digital coded speech, for example at 16.1 Kbps/call. The base station 420 uplinks downsampled radiotelephone signals (downsampled digital IF) to cellular radio exchange 410 at a rate of, for example 120 Kbps/call. Thus, the downlink and the uplink are performed at rates that are an order of magnitude of kilobits per second per radiotelephone communication. This contrasts with a wide bandwidth uplink or downlink having rates that are an order of magnitude of Mbps per radiotelephone communication.

In FIG. 4, the uplink is shown as two channels of uplink 440a and 440b, and the downlink is shown as two channels of downlink 450a and 450b. This allows for diversity transmission and diversity reception by the base station, as will be described below. However, it will be understood that the two channels may be combined in a single channel for uplink and downlink and then separated for diversity transmission and reception. It will also be understood that the uplink and/or downlink may be provided by a radio frequency connection or a wired connection. When wired, the present invention allows the use of a standard ISDN, T1 or E1 connections between the cellular radio exchange 410 and the base station 420. Alternatively, narrow bandwidth wireless connections may be used including RF and infrared connections.

Still referring to FIG. 4, when a radiotelephone communication is to be transmitted by base station 420 to a radiotelephone 130, the communication is provided by processor 270 to speech coder 272 and channel coder 274. The digital coded speech from channel coder 274 is downlinked to the base station 420 over downlink 450a, 450b. For diversity transmission, a pair of narrowband transmitters 490a, 490b, respectively labeled "Narrowband Transmitter A" and "Narrowband Transmitter B" are provided. The respective narrowband transmitters each include a modulator 276a, 276b, a digital-to-analog converter 202a, 202b and a narrowband filter 204a', 204b'. The respective outputs of the narrowband filters 204a', 204b' are provided to respective radio frequency transceivers 230a, 230b, for diversity transmission via respective antennas 224a, 224b. Each radio frequency transceiver 230a, 230b includes a modulator 206a, 206b, a transmit local oscillator (TXLO) 208a, 208b, a power amplifier 210a, 210b, and an isolator 212a, 212b. Accordingly, the radio frequency transceivers 230a, 230b perform radio frequency up-conversion of the modulated digital coded speech signal.

Continuing with the description of FIG. 4, a communication from a cellular radiotelephone is received at antennas 224a and 224b which act as diversity antennas. The received communication is routed to respective low noise amplifier 214a, 214b by the respective isolator 212a, 212b and is down converted by the respective demodulator 216a, 216b and respective receive local oscillators (RXLO) 218a, 218b. The received down converted radiotelephone communication signals are provided to respective narrowband receivers 480a, 480b, also respectively labeled "Narrowband Receiver A" and "Narrowband Receiver B" in FIG. 4. The narrowband receivers include respective narrowband channel filters 220a', 220b' that provide the correct spectral input to respective analog-to-digital converters (ADC) 222a, 222b. The analog-to-digital converters provide a sampling function to oversample the downconverted received radiotelephone communications signal.

The oversampled signals from the analog-to-digital converters 222a, 222b are provided to a respective synchronizer/downsampler 470a, 470b. As is well known to those having skill in the art, a synchronizer finds an optimal timing and phase for the received sampled signal. The downsampler then uses the result from the synchronizer to reduce the amount of data that needs to be uplinked to the diversity combiner 456 in cellular radio exchange 410.

More specifically, conventional communication systems use Nyquist rate sampling (two samples per symbol). These two samples per symbol are generally sufficient to perform coherent clock and carrier recovery and detection. Generally, one sample is used for detection and is thus obtained in the middle of a symbol and the other sample is obtained at zero crossing and used for timing recovery. In sharp contrast, according to the invention, the signal is initially oversampled, for example at eight samples per symbol. All eight samples may then be used to determine the correct carrier frequency offset and synchronization timing. Once synchronization is determined, only one of every eight samples may be retained. Accordingly, the sampling rate may be dropped from 200 kHz to 24 kHz. This optimum sample may be determined by a maximum likelihood function.

Accordingly, sampling initially is performed above the Nyquist rate (oversampling) in order to obtain synchronization and thereafter is sampled at below the Nyquist rate (undersampling). Accordingly, the downsampled radiotelephone signals may be uplinked to the cellular radio exchange 410 using a narrowband uplink 440a, 440b, while still allowing diversity demodulation in the cellular radio exchange 410, as will be described below. Diversity demodulation in the cellular radio exchange can lower the overall cost of the cellular radiotelephone communications system 400 and facilitate soft handoff between base stations.

Figure 5:
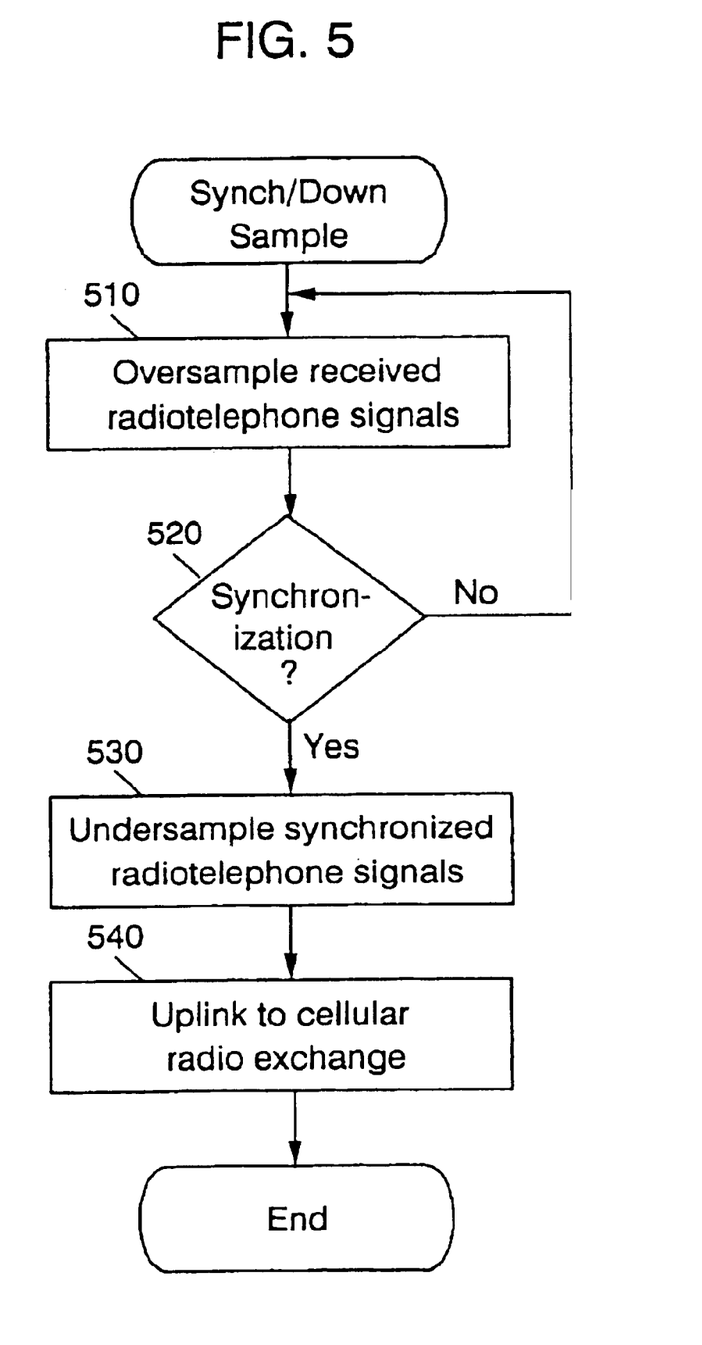
FIG. 5 is a flowchart illustrating synchronization and downsampling according to the present invention.

FIG. 5 is a flowchart that illustrates synchronization and downsampling (Block 470a, 470b of FIG. 4). As shown in FIG. 5, the received radiotelephone signals are oversampled at Block 510 at a rate that is higher than the Nyquist rate, such as eight samples per symbol. At Block 520, a test is made as to whether synchronization was obtained. If not, then oversampling continues. If synchronization was obtained, then at Block 530, the synchronized radiotelephone signals are downsampled, for example by retaining only one of every eight samples per symbol (undersampled). This one sample per symbol is uplinked to the cellular radio exchange at Block 540. Accordingly, sub-Nyquist sampling is used after synchronization has been obtained.

Referring again to FIG. 4, the downsampled or undersampled radiotelephone signals are uplinked to the cellular radio exchange 410 via uplink 440a, 440b. In cellular radio exchange 410, demodulator 450, preferably including a diversity combiner/equalizer 456, is used to diversity combine the input from the two receivers, to thereby allow enhanced reception quality. The combined input is then used to detect the data. The output of the demodulator 450 is then provided to channel decoder 255, which uses a specified redundancy in the detected data to further improve reception quality. The speech decoder 260 provides the desired voice or data service to the user. Processor 270 can provide additional functions, as was described in connection with FIGS. 2 and 3, and is also connected to the PSTN 160. Radiotelephone communications that are received at the cellular radio exchange 410 are transmitted to the radiotelephones via speech decoder 272 and channel coder 274.

Accordingly, low bit rate uplink and downlink may be provided between the cellular radio exchange and the base stations of cellular radiotelephone communication systems, while still allowing diversity transmission and reception. Low cost and/or high quality cellular radiotelephone systems and methods may thereby be provided.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A communications method between a cellular radiotelephone base station and a cellular radio exchange, comprising the steps of:

downlinking digital coded speech from the cellular radio exchange to the cellular radiotelephone base station; and uplinking undersampled radiotelephone signals from the cellular radiotelephone base station to the cellular radio exchange.

2. A method according to claim 1 wherein the uplinking step is followed by the step of:

demodulating the undersampled radiotelephone signals at the cellular radio exchange.

3. A method according to claim 2 wherein the downlinking step is followed by the step of:

modulating the digital coded speech at the cellular radiotelephone base station.

4. A method according to claim 2 wherein the demodulating step is followed by the step of:

decoding speech from the demodulated undersampled radiotelephone signals at the cellular radio exchange.

5. A method according to claim 3 wherein the modulating step is followed by the step of:

transmitting the modulated digital coded speech as a radio frequency signal at the cellular radiotelephone base station.

6. A method according to claim 2 wherein the demodulating step comprises the step of:

diversity demodulating the undersampled radiotelephone signals at the cellular radio exchange.

7. A method according to claim 1 wherein the downlinking step and the uplinking step are performed at rates that are an order of magnitude of kilobits per second per radiotelephone communication.

8. A method according to claim 3 wherein the modulating step comprises the step of:

modulating the digital coded speech in a narrowband transmitter at the cellular radiotelephone base station.

9. A method according to claim 1 wherein the uplinking step is preceded by the step of:

undersampling received radiotelephone signals at the cellular radiotelephone base station.

10. A method according to claim 9 wherein the undersampling step comprises the step of undersampling the received radiotelephone signals in a narrowband receiver at the cellular radiotelephone base station.

11. A method according to claim 9 wherein the undersampling step comprises the steps of:

oversampling the received radiotelephone signals at the cellular radiotelephone base station to perform synchronization; and thereafter, undersampling the synchronized received radiotelephone signals at the cellular radiotelephone base station.

12. A communications method for a cellular radiotelephone base station that communicates with a cellular radio exchange and with a plurality of cellular radiotelephones, comprising the steps of:

receiving digital coded speech from the cellular radio exchange;

undersampling radiotelephone signals that are received from the plurality of radiotelephones; and transmitting the undersampled radiotelephone signals to the cellular radio exchange.

13. A method according to claim 12 wherein the receiving step is followed by the step of:

modulating the digital coded speech.

14. A method according to claim 13 wherein the modulating step is followed by the step of:

transmitting the modulated digital coded speech to at least one of the cellular radiotelephones.

15. A method according to claim 13 wherein the receiving step and the transmitting step are performed at rates that are an order of magnitude of kilobits per second per radiotelephone communication.

16. A method according to claim 13 wherein the modulating step comprises the step of:

modulating the digital coded speech in a narrowband transmitter.

17. A method according to claim 12 wherein the undersampling step comprises the step of downsampling the received radiotelephone signals in a narrowband receiver.

18. A method according to claim 12 wherein the undersampling step comprises the steps of:

oversampling the received radiotelephone signals to perform synchronization; and thereafter, undersampling the synchronized received radiotelephone signals.

19. A communications method for a cellular radio exchange that communicates with a cellular radiotelephone base station, comprising the steps of:

transmitting digital coded speech to the cellular radiotelephone base station; and receiving undersampled radiotelephone signals from the cellular radiotelephone base station.

20. A method according to claim 19 wherein the receiving step is followed by the step of:

demodulating the undersampled radiotelephone signals.

21. A method according to claim 20 wherein the demodulating step is followed by the step of:

decoding speech from the demodulated undersampled radiotelephone signals.

22. A method according to claim 20 wherein the demodulating step comprises the step of:

diversity demodulating the undersampled radiotelephone signals.

23. A method according to claim 19 wherein the transmitting step and the receiving step are performed at rates that are an order of magnitude of kilobits per second per radiotelephone communication.

24. A cellular radiotelephone communications system comprising:

a plurality of cellular radiotelephone base stations that communicate with a plurality of cellular radiotelephones and that uplink undersampled radiotelephone signals; and a cellular radio exchange that receives the uplinked undersampled radiotelephone signals and that downlinks digital coded speech to the plurality of cellular radiotelephone base stations.

25. A system according to claim 24 wherein the cellular radio exchange further comprises:

a demodulator that demodulates the undersampled radiotelephone signals.

26. A system according to claim 24 wherein the cellular radiotelephone base stations each further comprise:

a modulator that modulates the digital coded speech.

27. A system according to claim 25 wherein the cellular radio exchange further comprises:

a decoder that is responsive to the demodulator to decode speech from the demodulated undersampled radiotelephone signals.

28. A system according to claim 26 wherein the cellular radiotelephone base stations further comprise:

a radio frequency transmitter that is responsive to the modulator to transmit the modulated digital coded speech as a radio frequency signal.

29. A system according to claim 25 wherein the demodulator is a diversity demodulator.

30. A system according to claim 24 wherein the plurality of cellular radiotelephone base stations uplink undersampled radiotelephone signals to the cellular radio exchange and the cellular radio exchange downlinks digital coded speech to the plurality of cellular radiotelephone base stations at rates that are an order of magnitude of kilobits per second per radiotelephone communication.

31. A system according to claim 24 wherein the modulator is a narrowband modulator.

32. A system according to claim 24 wherein the cellular radiotelephone base station further comprises:

an undersampler that undersamples received radiotelephone signals.

33. A system according to claim 32 wherein the undersampler is a narrowband undersampler.

34. A system according to claim 32 wherein the undersampler comprises:

an oversampler that oversamples the received radiotelephone signals to perform synchronization; and an undersampler that is responsive to the oversampler to undersample the synchronized received radiotelephone signals.

35. A cellular radiotelephone base station comprising:

a transmitter that transmits undersampled radiotelephone signals to a cellular radio exchange; and a receiver that receives digital coded speech from the cellular radio exchange.

36. A cellular radiotelephone base station according to claim 35 further comprising:

a modulator that modulates the digital coded speech.

37. A cellular radiotelephone base station according to claim 36 further comprising:

a radio frequency transmitter that is responsive to the modulator to transmit the modulated digital coded speech as a radio frequency signal.

38. A cellular radiotelephone base station according to claim 35 wherein the transmitter transmits undersampled radiotelephone signals to the cellular radio exchange and the receiver receives digital coded speech from the cellular radio exchange at rates that are an order of magnitude of kilobits per second per radiotelephone communication.

39. A cellular radiotelephone base station according to claim 36 wherein the modulator is a narrowband modulator.

40. A cellular radiotelephone base station according to claim 35 further comprising:

an undersampler that undersamples the received radiotelephone signals, the transmitter being responsive to the undersampler.

41. A cellular radiotelephone base station according to claim 40 wherein the undersampler is a narrowband undersampler.

42. A cellular radiotelephone base station according to claim 40 wherein the undersampler comprises:

an oversampler that oversamples the received radiotelephone signals to perform synchronization; and an undersampler that is responsive to the oversampler to undersample the synchronized received radiotelephone signals.

43. A cellular radio exchange comprising:

a receiver that receives undersampled radiotelephone signals from a cellular radiotelephone base station; and a transmitter that transmits digital coded speech to the cellular radiotelephone base station.

44. A cellular radio exchange according to claim 43 further comprising:

a demodulator that is responsive to the receiver to demodulate the undersampled radiotelephone signals.

45. A cellular radio exchange according to claim 44 further comprising:

a decoder that is responsive to the demodulator to decode speech from the demodulated undersampled radiotelephone signals.

46. A cellular radio exchange according to claim 45 wherein the demodulator is a diversity demodulator.

47. A cellular radio exchange according to claim 43 wherein the receiver receives undersampled radiotelephone signals from the cellular radiotelephone base station and the transmitter transmits digital coded speech to the cellular radiotelephone base station system at rates that are an order of magnitude of kilobits per second per radiotelephone communication.

* * * * *

UNITED STATES PATENT AND TRADEMARK OFFICE
CERTIFICATE OF CORRECTION

PATENT NO. : 6,792,267 B1
DATED : September 14, 2004
INVENTOR(S) : Backstrom et al.

It is certified that error appears in the above-identified patent and that said Letters Patent is hereby corrected as shown below:

Title page,
Item [56], References Cited, OTHER DOCUMENTS, should include:
-- International Search Report, PCT/US 99/10783, September 15, 1999

Staba et al., *CDMA Cellular Architecture for Army Tactical Communications*, IEEE, MILCOM 97 Proceedings, November 3-5, 1997, Vol. 3, November 3, 1997, pp. 1303-1307 --

Signed and Sealed this

Second Day of August, 2005

JON W. DUDAS
*Director of the United States Patent and Trademark Office*